United States Patent [19]

Fallon

[11] 4,343,325

[45] * Aug. 10, 1982

[54] VALVE ASSEMBLY AND COUPLER THEREFOR

[75] Inventor: Merton R. Fallon, Thousand Oaks, Calif.

[73] Assignee: Draft Systems, Inc., Northridge, Calif.

[*] Notice: The portion of the term of this patent subsequent to Jan. 1, 1997, has been disclaimed.

[21] Appl. No.: 73,624

[22] Filed: Sep. 10, 1979

Related U.S. Application Data

[63] Continuation of Ser. No. 837,450, Sep. 28, 1977, Pat. No. 4,181,143.

[51] Int. Cl.³ ............... F16K 51/00; F16L 37/00; B65D 83/00
[52] U.S. Cl. .................. 137/212; 137/322; 220/316; 220/319; 222/400.7; 277/188 R
[58] Field of Search .............. 137/212, 320, 321, 322; 222/400.7, 400.8; 220/293, 300, 303, 316, 319, 320; 277/188 A, 188 R, 189; 251/214

[56] References Cited

U.S. PATENT DOCUMENTS

| | | | |
|---|---|---|---|
| 2,627,997 | 2/1953 | Wittenberg | 220/316 |
| 2,836,443 | 5/1958 | Farmer | 277/188 R |
| 3,086,749 | 4/1963 | Frye | 251/214 |
| 3,135,439 | 6/1964 | Leslie | 222/464 |
| 3,353,724 | 11/1967 | Johnston | 137/322 |
| 3,473,556 | 10/1969 | Johnson et al. | 137/322 |
| 3,602,340 | 8/1971 | Budzich et al. | 251/214 |
| 3,913,783 | 10/1975 | Cooper | 220/300 |

FOREIGN PATENT DOCUMENTS

| | | |
|---|---|---|
| 709717 | 5/1965 | Canada. |
| 709718 | 5/1965 | Canada. |
| 2130033 | 1/1972 | Fed. Rep. of Germany. |
| 1632052 | 6/1973 | Fed. Rep. of Germany. |
| 2639918 | 3/1978 | Fed. Rep. of Germany ... 222/400.7 |
| 1355712 | 2/1963 | France ............... 137/322 |
| 1449198 | 10/1965 | France ............... 137/212 |
| 1503773 | 10/1966 | France ............... 220/293 |
| 1003447 | 9/1965 | United Kingdom. |
| 1105615 | 3/1968 | United Kingdom. |
| 894996 | 4/1972 | United Kingdom. |
| 1291619 | 10/1972 | United Kingdom. |
| 1382735 | 2/1975 | United Kingdom. |
| 1402631 | 8/1975 | United Kingdom ....... 137/212 |
| 1416781 | 12/1975 | United Kingdom. |
| 1553680 | 10/1979 | United Kingdom. |

Primary Examiner—George L. Walton
Attorney, Agent, or Firm—LeBlanc, Nolan, Shur & Nies

[57] ABSTRACT

An improved valve system for obtaining access to a container of fluid. In a container of fluid, and particularly a keg for beer, a valve assembly receiving member or keg neck extends from the top of the container. A sealing mechanism is provided to secure the valve assembly in sealed relationship with the keg neck and to allow access to the fluid contained by actuation of the valves. More specifically, the valve neck has a groove in its inner surface to receive a resilient retainer ring which maintains the valve assembly in place. In addition, a safety feature is provided to prevent inadvertent expulsion of the valve assembly should the retainer ring be dislodged while the keg is pressurized. A siphon tube extends from the valve assembly to a position adjacent the bottom of the keg when the valve is secured within the keg neck. The bottom portion of the tube is configured to enhance the flow of fluid into and out of the tube as well as carry a spring member for cooperating with one of the valve members in the valve assembly. An improved coupler mechanism is employed in operating the valves while avoiding inadvertent opening and closing of the valve assembly. A handle is provided on the coupler for moving the valve actuating elements between an open and a closed position. A locking mechanism on the coupler prevents engagement and disengagement of the coupler while it is in the open position.

48 Claims, 11 Drawing Figures

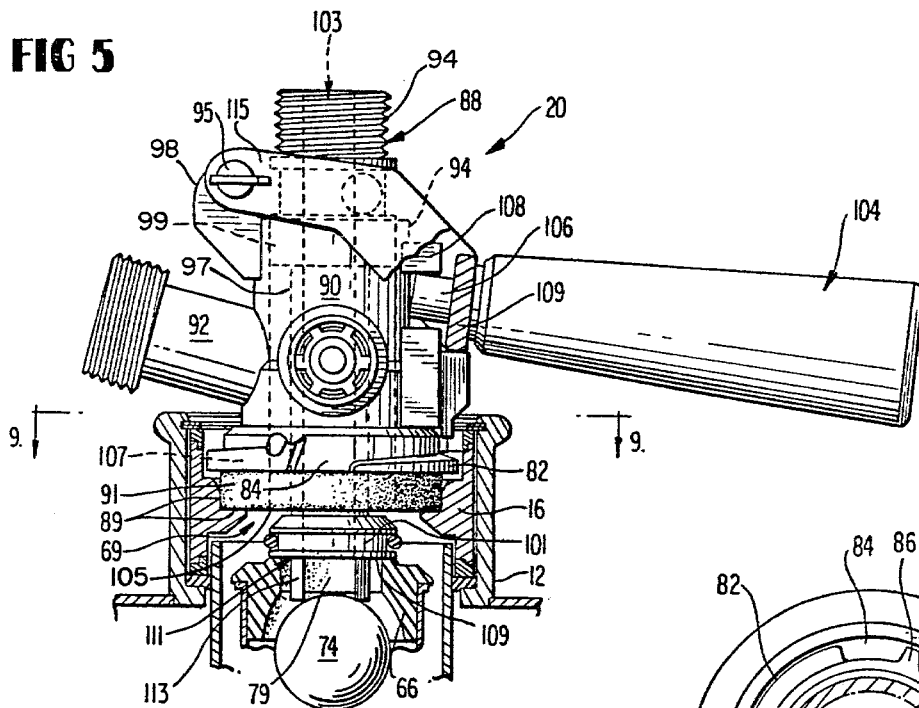
FIG 5
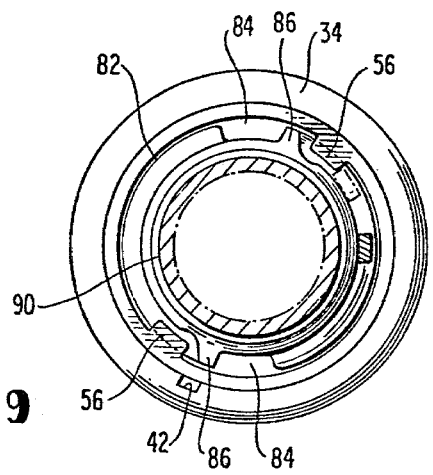
FIG 9
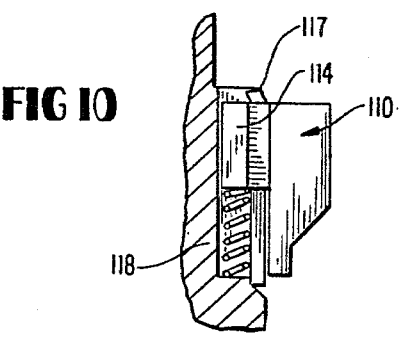
FIG 10
FIG 11

VALVE ASSEMBLY AND COUPLER THEREFOR

This is a continuation, of application Ser. No. 837,450, filed Sept. 28, 1977, now U.S. Pat. No. 4,181,143.

BACKGROUND OF THE INVENTION

In systems for tapping kegs of fluid and particularly containers of beer there has been used a valve assembly secured to the top of the keg for providing access to the fluid ultimately to be delivered from the keg to a remote position for distribution. Typically, the valve assembly includes a dual valve arrangement with a siphon tube which extends from the valve assembly to the bottom of the keg. The valve assembly is fixed within the keg neck or other valve receiving member to provide a valved access to the fluid once it is pressurized. The valve system, when tapped by a coupler or some other keg tapping means connected to a pressure source, allows pressurized gas to flow into the keg until the desired pressure within the keg is achieved to force the fluid out of the keg through the valve system and ultimately to a distribution device where the fluid can be used to fill glasses and the like. The valve system is one which allows the pressurized gas, usually carbon dioxide, to be forced into the keg but only allows the fluid to be forced out of the keg to distribution device until the keg is entirely emptied of fluid.

The valve assembly includes a body portion which carries an O-ring in sealing engagement with the keg neck to prevent leakage along the interface between the valve body and the neck. To achieve the seal, the O-ring is maintained in a deformed disposition between two metal shoulders of the valve body portion and the keg neck. In units presently available, metal shoulders are moved toward each other to compress the O-ring seal by a threaded fitting threadedly engaged with the keg neck. As the threaded fitting is turned down, the shoulders rotate relative to each other and simultaneously move downward lineally to deform the O-ring between the valve body and the keg neck. The more the fitting is rotated, the more lineal thrust is imparted to the O-ring deforming it even further.

The problem with this approach is that there is no effective way to limit the compression imparted to the sealing ring. Without such a limitation the sealing ring can be over compressed where it will be subjected to "compression set" in which case the seal will not return substantially to its uncompressed state when the lineal thrust is reduced. This detracts from the ability of the O-ring to maintain its sealing characteristics over a long period of time. Also, the sealing ring may be damaged by action of the shoulders rotating against the surface of the seal thereby negating its sealing properties.

Besides the loss in the efficacy of the seal due to overcompression or damage caused by the rotation by two metal parts, the threads can be loosened after continued use allowing the seal to be violated inadvertently. In addition, a rotation movement is usually employed in attaching a tapping member or a coupler to the valving system. Where threaded fittings are used it is quite easy for the turning of the tapping devices to also rotate the threaded fittings thereby unscrewing one fitting relative to the other moving it lineally away from the O-ring allowing the seal to be violated.

Some valve assemblies used with kegs have included a dual valve system having two valve members each biased into engagement with its respective valve seat. To bias at least one of the valve members, a helical spring circumscribing the siphon tube is utilized. A spring retaining cup is used to hold the helical spring in place with sufficient compression to maintain the valve in a normally closed position. The cup extends downwardly from the valve body about the helical spring and has a radially projecting surface extending inwardly toward the siphon tube to support the bottom of the spring. By having the helical spring disposed in this manner, it becomes difficult to clean, allowing residue to build up in the spring coils. Because the cleaning fluids are injected under pressure through the valves, the location of the helical spring adjacent the siphon tube is one which is not readily accessible to the path taken by pressurized cleaning fluid. In addition, by being enclosed by the cup portions, the coils of the spring are not sufficiently exposed to receive the full effect of the cleaning fluid. Where the residue is not completely cleaned away, it can adversely affect the quality of fluid added to the keg for later distribution.

With regard to the coupler or other tapping mechanism, they are inserted by rotation into the valve assembly. Then by separate action, the handle is actuated to open the valves and permit the flow of fluid into and out of the keg in the appropriate channel. After the fluid has been completely dispensed from the keg, the reverse sequence is followed to reseal the valves. If the aforementioned sequence is followed, there will be no loss of fluid or gas in the tapping or untapping procedure.

However, if the handle is inadvertently placed in the tapped or valve open position prior to attaching the coupler to the valve assembly, the valves will be moved to an open position before the coupler is fully in place allowing some leakage to occur until the coupler rotated sufficiently to seal the interface between the coupler and valve assembly. Similarly, if the handle is not relocated to close the valves prior to untapping, leakage will occur until the coupler is rotated out of the valve assembly to a position where the valves reach their naturally closed position. Particularly where the keg contains toxic or otherwise dangerous fluid, the leakage occurring from failure to follow the correct tapping and untapping procedure constitutes a physical danger to the operator. For example, where the keg contains concentrated agricultural chemicals, such as pesticides, insecticides, fertilizer, etc., leakage of these chemicals through an improper coupling technique can be seriously deleterious to the health of the operator.

SUMMARY OF THE INVENTION

The invention is directed to overcoming many of the deficiencies which have plagued valve systems used in conjunction with pressurized containers which presently exist. Broadly stated, the invention relates to improved method and apparatus for tapping and untapping containers of fluid. Under this umbrella, there is provided better sealability between movable parts to prevent unnecessary leakage, safer operability to protect the operator even from his own errors, and constructional features facilitating cleaning operations and economic savings in manufacturing and assembly, among others.

With regard to the sealing features, the invention relates to imparting lineal thrust against a deformable sealing member between two surfaces substantially without relying on rotation. This allows better tolerances to maintain the seal over long periods of time and to avoid inadvertent violation of the seal due to operation of the valve system in tapping and untapping procedures. Moreover, "compression set" is avoided because of the tolerances that can be maintained and controlled by the use of a non-rotative system. In addition, the system is one which is easy to install and provides substantial safety advantages over the systems which have characterized the keg tapping systems of the past.

More specifically, as defined in the preferred embodiment hereinafter, the invention includes a keg neck which is of a generally cylindrical configuration having one end welded to the top of the keg and the other end open for receiving the valve assembly. The bottom portion of the keg neck has an annular ring extending radially inwardly from the inner walls of the neck. The upper surface of this ring engages an O-ring or other sealing means for sealing the interface between the valve assembly and the keg neck. The valve assembly includes a valve body having an outer surface also of a generally cylindrical configuration with an outer diameter slightly less than the inner diameter of the neck. A bottom portion of the valve body defines a seal engaging surface which, under pressure, provides lineal thrust deforming the seal against the upper surface of the annular ring extending from the keg neck.

The upper portion of the keg neck defines an annular groove for receiving a resilient retaining ring. The retaining ring when placed into the groove tends to expand and maintain its position within the groove. The retaining ring also cooperates with the top portion of the valve body to retain it in place thrust against the O-ring between the bottom portion of the valve body and the upper surface of the radial ring.

There is also an offset keyway defined through the groove which cooperates with a boss or key on the valve body. This allows the insertion of the valve body into the neck and retention there even when the retaining ring is withdrawn. The keyway has two recessed portions: one extends downwardly through a lower lip in the groove and the other extends upwardly from the upper lip in the groove. Both portions are offset vertically and circumferentially from each other. In this way, to locate the valve body within the neck, the key is registered with the first recessed area and moved downwardly, then rotated until it registers with the second recessed area, and moved further downwardly until the groove is exposed for receiving the retaining ring. With this configuration, should the retaining ring be inadvertently dislodged while the key is under pressure, the keg will engage an upper lip of the groove above the second recessed area, preventing it from being expelled from the keg. This safety feature prevents injury to those persons who may tamper with the valve system when the keg is under pressure.

As more fully described in the preferred embodiment, the valve assembly includes a dual valve system with each valve member being biased in a closed position with its respective valve seat. The siphon tube carries at least one of the valve members and extends from the valve assembly to the position adjacent the bottom of the keg. To the bottom portion of the siphon tube is secured a helical spring which is located in the interior portion of the tube and extends to the bottom of the keg. The spring is maintained in compression between the tube and the keg bottom to bias the tube and ultimately the valve member against its respective valve seat. The location of the spring in this manner insures that cleaning fluids forced through the tube will completely wash the coils of the spring to prevent accumulation of residue. In addition, the bottom of the siphon tube is flared to prevent occlusion of the tube should it be extended flush with the bottom surface of the keg. The flared tube also defines a flow path from the tube which enhances flow distribution of fluid through the keg for cleaning purposes.

In actually tapping the keg, a coupler having a movable probe for actuating the valves in the valve assembly is secured to the top portion of the valve assembly. The actuating mechanism of the coupler includes a handle which is movable between an open position where the probe is extended to open the valves to a closed position where the probe is retracted allowing the valves to revert to their normally closed state. A locking mechanism is incorporated with the coupler to prevent attachment of detachment of the coupler with the valve assembly whenever the handle is in the open position, thereby ensuring that the valves are never opened until the coupler is fully secured in place.

It is an object of the invention to achieve an improved sealing relationship between a keg neck and the valve body of a valve for tapping a keg of fluid.

It is another object of the invention to provide a safe and dependable method of maintaining a valve body thrust against a deformable sealing member to enhance the sealing characteristics between the valve body and the valve neck.

A still further object of the invention is to control the tolerances between the sealing surfaces which engage the sealing member such that excessive or undue compression is not imparted to the seal, thereby imparting to the seal a longer sealing life.

A further object of the invention is to avoid damage to the seal due to unnecessary rotation of the seal engaging surfaces against the seal which can gouge and otherwise damage the seal.

A still further object of the invention is to facilitate ease of assembly and disassembly of the valve body with the keg neck.

Another object of the invention is to arrive at an economical device whose parts are simple to manufacture but still achieve the tolerances necessary for sealing and avoid the complexity which has characterized such devices in the past to enhance the repeatability and extend the life of the device.

Another object of the invention is to provide a valve system facilitating cleaning of various components of the system.

A further object is to prevent occlusion of the siphon tube particularly when it is fully extended flush with the bottom of the keg.

Still another object is to locate the spring member, which biases one of valve members of the valve system, inside the bottom of the siphon tube and to configure the siphon tube bottom to enhance the distribution of fluid passing therethrough such that cleaning fluids injected through the siphon tube will wash the spring means and be distributed throughout the keg.

A further object is to provide an improved coupler or tapping mechanism to operate the valves in the valve assembly substantially without leakage, particularly during attachment and detachment of the coupler with the valve mechanism.

It is also an object to incorporate a locking mechanism with the coupler to prevent the coupler from being engaged and disengaged while the mechanism for actuating the valves is in an extended or operative mode.

Another object is to provide a coupler assembly for actuation of valves of a valve assembly which avoids inadvertent actuation by requiring predetermined steps before the handle can be moved from one position to another.

BRIEF DESCRIPTION OF THE DRAWINGS

FIG. 5 is a side view of a coupler secured within the valve assembly shown in FIG. 1.

FIG. 9 is a cross-sectional view of the coupler secured within the valve of FIG. 5 taken along lines 9—9.

FIG. 10 is a partial cross-sectional view of a lock pin mechanism of FIG. 7 taken along lines 10—10.

FIG. 11 is a top view of the lock pin mechanism of FIG. 10.

DETAILED DESCRIPTION OF THE PREFERRED EMBODIMENT

Figures 1, 2, 3:
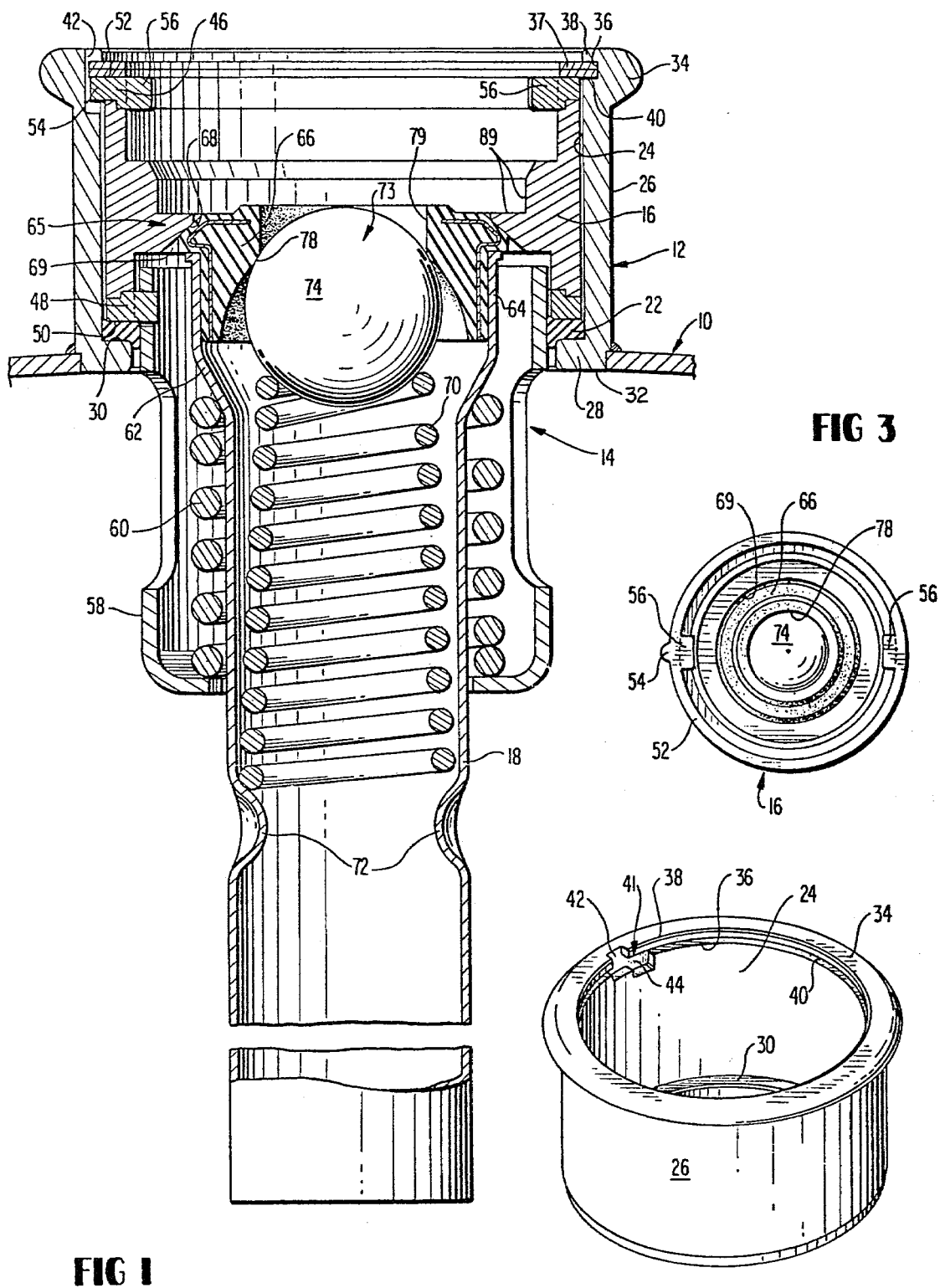
FIG. 1 is a cross-section of the valve assembly as secured within a neck extending from the top portion of a container.
FIG. 2 is a perspective view of the neck shown in FIG. 1.
FIG. 3 is a top view of the valve assembly removed from the valve neck.

Referring to FIG. 1 there is shown a keg 10 with a neck 12 affixed to the top of the key by welding. Secured within this neck is a valve assembly 14 which includes a valve body 16 having a siphon tube 18 extending from the bottom of the valve body to a position adjacent to the bottom of the keg. Coupler assembly 20 as shown in FIG. 5, is secured to the valve assembly 14 in a manner which allows pressure to be imparted through the coupler assembly 20 to the interior portions of the keg for pressurizing the liquid therein which in this case is beer and also provides an outlet for the liquid to a conduit downstream of the coupler assembly.

Because the valve assembly 14 and the neck 12 are separate and independent parts a seal is provided between them to insure that the fluid under pressure as well as the gas providing the pressure does not leak between the joints of the valve assembly and the neck. To this end a deformable O-ring 22 is secured between the keg neck 12 and the valve assembly 14 at the appropriate place to prevent any such leakage. The valve neck 12 is generally cylindrical having an inner surface 24 and an outer surface 26. An annular ring 28 extends radially inwardly from the inner surface of the bottom portion of the valve neck 12. This annular ring 28 has an upper surface 30 for engaging a portion of the deformable O-ring 22 and a lower surface 32 which is welded adjacent to the top of the keg. The top portion of the neck 12 defines a bushing 34 which has a groove therein 36 extending entirely around the circumference of the inner surface 24 for receiving resilient retainer ring 37. This groove 36 has an upper lip 38 and a lower lip 40 which engage the upper and lower portions respectively of the resilient retainer ring 37. A keyway 41 has a first recessed area 42 which communicates with the top portion of the neck 12 through the upper lip 38 of the groove 36, with the lower lip 40 of the groove 36 providing the lower boundary of the first recessed area 42. A second recessed area 44 communicates with the lower lip 40 of the groove 36 and extends downwardly therefrom and is offset circumferentially from the first recessed area 42 and is bound at its upper limit by the upper lip 38 of the groove 36. In this way movement through the keyway 41 defines a path that is vertically downward and then laterally through the groove 36 until the second recessed area 44 is reached and then downwardly again.

The valve assembly includes a valve body 16 which has an upper portion 46 and a lower portion 48. The lower portion 48 has a bottom complementary seal engaging surface 50 which presses against O-ring 22 when the valve body 16 is in the retained position within the neck 12. The upper portion of the valve body 16 includes a retainer ring engaging surface 52 which, as can be seen in FIG. 1, engages the resilient retainer ring 37 thereby maintaining the valve body in the desired position within the valve neck and compressing the O-ring 22 for achieving the seal between the valve body 16 and the neck 12.

A feature of the above-described arrangement for deforming the O-ring 22 between the valve assembly 14 and the keg neck 12 is the ability to control the tolerances between these elements to insure that the O-ring 22 is sufficiently deformed to provide sealing and also to avoid overcompression of the O-ring 22 so that it is not subject to "compression set". "Compression set" is a measure of an elastomer material inability to return its originally uncompressed state after it has been subjected to actual material compression. In this regard, it should be noted that actual material compression is to be distinguished from deformation where the seal merely conforms to the configuration of the cavity in which it is placed and under lineal thrust. Elastic O-ring 22 having a circular cross-section is placed between the upper surface 30 of the annular ring 28 and the lower surface 50 of the valve body 16. As the valve body is pressed downwardly imparting lineal thrust on the O-ring 22, the O-ring 22 deforms into a configuration of the rectangle as shown in FIG. 1 to seal the joint and allow the resilient retainer ring to be placed in the groove 36 to maintain the predetermined amount of thrust on the O-ring 22. By using the smooth cylindrical surfaces, as described above, with the retaining ring and groove combination, substantial thrust on the elastomer to effect the seal will always be achieved with comfortable tolerances on machining parts. This is accomplished without literally compressing the material of the sealing ring which will cause it to take up "compression set" and incur leakage with the passage of time.

More specifically, the O-ring employed in the above valve assembly 14 and valve neck 12 has a cross-sectional diameter in its free state which is approximately 0.140 inches. When the O-ring 22 is compressed to a rectangular cross-section as described above, the rectangular dimension measured vertically is approximately 0.109 inches; meaning that the lineal thrust has been accomplished through a distance of 0.031 inches or 21.5% of its free state dimension. This distance of 0.031 inches is a substantial one that can be worked with very comfortably in dealing with machine tolerances. In other words, the dimensions between the groove and the surfaces for compressing the O-ring 22 can be defined well within a range to achieve the deformation for sealing without literally compressing the material resulting in "compression set".

A key 54 extends from the upper portion of the valve body 16 for engagement with the keyway 41 in the neck 12. The key 54 extends sufficiently into the recessed areas 42, 44 to allow for movement within the recessed areas 42, 44, but is restrained from movement beyond the boundaries defining the keyway 41. With this configuration the key 54 can be moved vertically to the lower lip 40 in the first recess area 42, laterally along the groove 36 connecting the recessed areas 42, 44 and downwardly into the second recessed area 44. In this way, to place the valve body 16 into the neck 12 so that the retaining ring 37 can be placed within the groove 36, the valve body 16 must initially be rotated to a position where the key 54 registers with the first recessed area 42. In this position, the valve body can be lowered downwardly until the key 54 abuts the lower lip 40 of the groove 36. The valve body 16 is then rotated until the key 54 is registered with the second recessed area 44 at which point the valve body 16 can be lowered further until the retainer ring engaging surface 52 of the valve body is sufficiently below the groove 36 to allow insertion of the retainer ring 37 for holding the valve body 16 in position.

With this configuration, the only way the valve body 16 can be removed is by first removing the retainer ring 37 which is difficult without the proper tools, and then rotating the valve body 16 to the correct position within the keyway 41 allowing it to be removed. This provides a safety mechanism to prevent expulsion of the valve assembly 14 upon inadvertent removal of the retaining ring 37.

But should the retaining ring 37 be inadvertently removed for some reason while the key 10 is pressurized, the valve body 16 will tend to remain in place because the upward pressure of the gas on the valve assembly 14 will force the valve body 16 slightly upwardly to a position where the key 54 engages the upper lip 38 of the groove 36 above the second recessed area 44. The only way the valve assembly 14 can be removed thereafter is by intentionally rotating it to a position where the key 54 registers with the first recessed area 42. By this time, the seal has been broken, equalizing the pressure in the keg, thus eliminating the danger of the valve assembly 14 being expelled forcibly. In any event, removal of the valve assembly can only be accomplished through intentional rotation through a path defined by the keyway 41.

Referring to FIG. 3, it can be seen that two lugs 56 extend radially inwardly from the top portion of the valve body 16. These lugs 56 provide a means for receiving and holding a coupler assembly 20 as shown in FIG. 5 in place to provide pressure to the keg through the valve assembly 14 and provide a path out of the key also through the valve assembly 14 to a position downstream where the fluid in the keg can be distributed. Now referring to FIG. 1, the details of the valve assembly 14 are shown. The valve assembly 14 comprises dual valves having a first valve 65 and a second valve 73 operating concentrically with each other about the axis of the siphon tube. Included with the first valve 65 is a spring retainer cup 58 for holding a helical compression external spring 60. The siphon tube 18 has a flared portion 62 near its top portion 64 which engages the top of the helical external spring 60. The bottom portion of the spring 60 rests on the bottom of the cup 58 as shown. The spring 60 is maintained between the bottom of the cup 58 and the flared portion 62 of the siphon tube 18 normally in a compressed position to bias the tube upwardly to maintain the first valve 65 in a normally closed position sealing annular first valve opening 69. A first valve member 66 is carried by the top portion 64 of the top of the siphon tube and engages a first valve seat 68. The helical spring 60 in its normal position maintains the engagement between the first valve member 66 and the valve seat 68 until the spring is compressed even further downwardly to allow displacement of the first valve member 66 away from the first valve seat 68 thereby opening the first valve 65.

The second valve 73 includes a second valve member 74 biased against a second valve seat 78 by an internal spring 70 to seal a second valve opening 79. Displaced from the top portion 64 of the siphon tube 18 are three circumferentially equidistant bulges 72 on the interior portion of the tube formed by impressing dimples on the exterior of the siphon tube 18. These bulges 72 provide a surface against which the bottom portion of the internal helical spring 70 rests. The top portion portion of the internal spring 70 engages the second valve member or ball 74 and presses it against the second valve seat 78 defined on the first valve member 66 as shown to maintain the second valve in a normally closed position. To open the second valve 73, the internal spring 70 is compressed allowing the ball 74 to be displaced from the second valve seat 78. In this way, the second valve closes and opens the opening 79 and the first valve 65 opens and closes the opening 69 which is concentric with opening 79.

Figure 6:
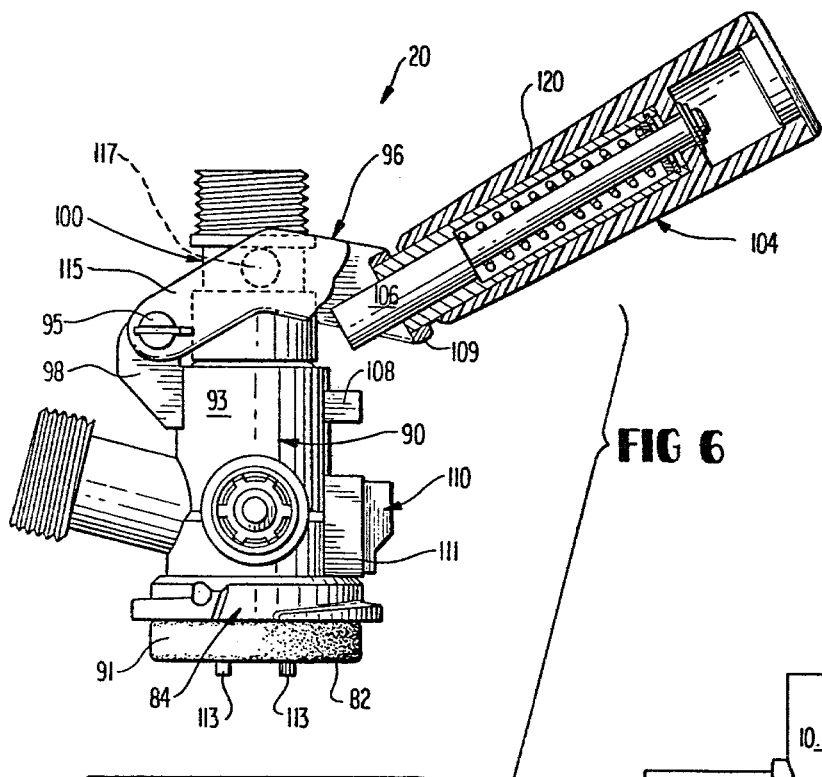
FIG. 6 is an exploded view of the coupler and valve assembly shown in FIG. 5.
Figure 7:
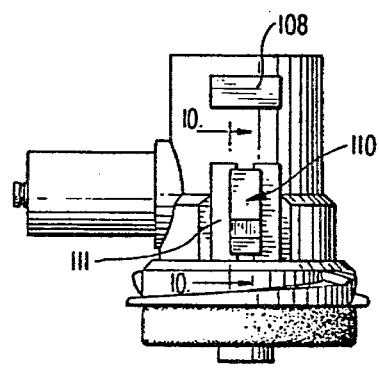
FIG. 7 is a rear elevation of the coupler shown in FIG. 6 with portions of the coupler removed.
Figure 8:
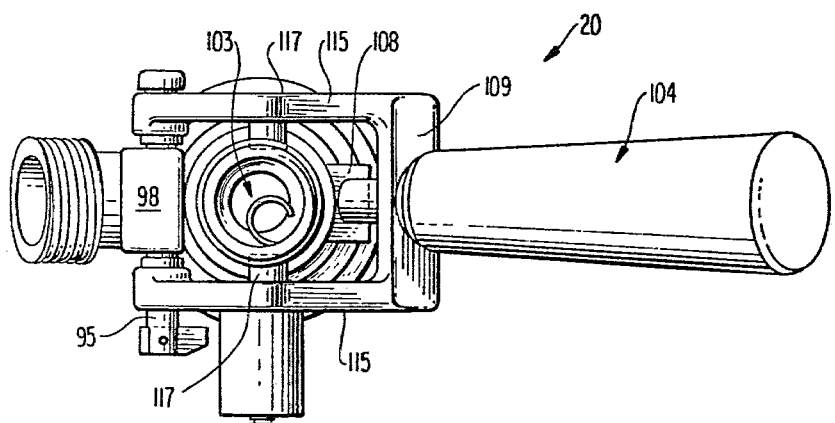
FIG. 8 is a top view of the coupler shown in FIG. 6.

The coupler assembly 20 cooperates with this valve assembly 14 to open the passageways along the exterior portion and through the interior portion of the siphon tube by moving valve members 66, 74 away from the respective valve seat 68, 78. Now refer to FIGS. 5 and 6 for the details of the coupler system and its interaction with the valve assembly 14 to open the various passageways and control the flow of gas for pressure and fluids for delivery downstream of the keg. The coupler assembly 20 has a coupler body 90 with a wedge surface 82 which is helical in configuration circumscribing the bottom of the coupler body 90 for engaging the lugs 56 on the valve assembly 14. Slots 84 are provided on either side of the coupler body 90 through the wedge surface 82 for allowing it to be inserted into the valve assembly 14 below the lugs 56.

Extending downwardly from the coupler body 90 is a coupler elastic seal 91 which registers with coupler sealing surface 89 defined in the valve body 16. Once the portion of the wedge surfaces 82 adjacent the slots 84 are in a position below the lugs 56, the coupler assembly 20 can be rotated in a clockwise direction relative to the valve body. This rotation in conjunction with the interaction of the wedge surfaces with the lug 56 forces the coupler assembly 20 downwardly pressing the coupler seal 91 against the sealing surface 89 of the valve body 16. Further rotation compresses the coupler seal 91 sufficiently to seal the interface between the valve body 16 and the coupler assembly 20. Abutments 86 provided on either side of coupler assembly 20 limit the rotation in the clockwise direction.

The coupler assembly 20 has a side fitting 92 through which the gas is forced under pressure into the keg through the passageway formed when the first valve 65 is in the open position. The coupler body 90 is a hollow cylinder 93 having a probe movable therein between an open and closed position to actuate the valves 65, 73.

The probe 88 has a shaft 97 carrying pistons, an upper piston 99 and a lower piston 101, displaced from each other along the longitudinal axis on either side of the intersection of the side fitting 92 as shown. Each piston 99, 101 has fixed in its periphery a sealing ring to seal the interface between the probes 99, 101 and the inner walls 107 of the cylinder 93. The portion of the shaft 97 extending upwardly from the upper piston 99 above the top of the coupler body 90 carries a top fitting 94 which provides a means for coupling with tubing or other conduits for delivering the fluid which is forced out of the keg when the coupler assembly 20 is in the open position. The shaft 97 defines a shaft passageway 103 along its longitudinal axis from one end of the shaft to the other.

The distance between the pistons 99, 101 within the cylinder is one which always maintains the upper piston 99 above the intersection of the side fitting 92 and the cylinder 93 during the stroke between the open and closed position. On the other hand, the lower piston 101 when moved to the open position extends beyond the bottom of the coupler body 90 to provide an annular opening 105 therethrough. Thus, in the open position an annular passage is formed through the bottom of the coupler body 90, along the space between the shaft 97 to the side fitting 92 for the gas used in pressurizing the keg. The gas in this passage is prevented from passing through the top of the coupler body 90 by the seal formed between the upper piston 99 and the inner walls 107. The shaft passageway 103 always remains clear and open when the coupler assembly 20 is in either the open or closed position.

The bottom of the lower piston 101 has a first valve member engaging surface 109 surrounding shaft passage opening 111 through the piston 101. On either side of the opening 111 two fork members 113 extend downwardly from lower piston 101. These fork members 113 are dimensioned to pass through the second valve opening 79 and engage ball 74. Similarly, the piston 101 is dimensioned to pass through the first valve opening 69 and engage in sealing relationship the first valve member 66.

With the above configuration, when coupler assembly 90 is engaged with the valve body the probe can be moved from a closed or retracted position where the valves remain closed to an open or extended position where the valves are opened allowing the flow of fluids in and out of the keg through the various passages in the coupler assembly 20. In the open or extended position as shown in FIG. 5, the fork member 113 engages ball 74 displacing it from second valve seat 78 thereby opening the second valve 73 and allowing fluid under pressure to pass through the siphon tube 18, around ball 74, out of second valve opening 79, into shaft passage opening 111, through the shaft passage 103 to the top fitting 94. Similarly, in the extended position, the first valve member engaging surface 109 on the lower piston 101 engages the first valve member 66 displacing downwardly away from the first valve seat 68 to open the first valve 65. In this open position the gas used to pressurize the keg is allowed to flow in the side fitting 92 through the annular space between the shaft 97 and the inner walls 107 of cylinder 93 out of the annular opening 105, and through the first valve opening 69 into the keg.

During the downstroke of the probe 88, the fork member 113 will engage the ball 74 prior to the engagement of the lower piston 101 with the first valve member 66. As a consequence the second valve 73 will be opened slightly before the first valve 65. Upon reaching its full extension the first valve member engaging surface 109 of the lower piston 101 in addition to opening the first valve 65 seals the interface between the piston 101 and the valve member 65 thereby preventing leakage between the gas and fluid flow paths. To close the valves 65, 73 the probe 88 is retracted to the closed position disengaging lower piston 101 to disengage the valve members 66, 74 allowing them to revert to their normally closed position.

Movement of the probe 88 downwardly is achieved by operation of a lever assembly 96 described in connection with FIGS. 5, 6, 7 and 8. A flange 98 extends from one side of the coupler body 90. The lever assembly 96 has two arms 115 spaced from each other each having one end connected to flange 98 by pivot pin 95. The other end of arms 115 carries a cross-bar 109 from which extends a handle 104 for use by the operator in moving the lever from an open position to a closed position. Approximately midway between the cross-bar 109 and the pivot pin 95 are two actuator pins 117, one on each arm 115 extending inwardly for engaging an annular recess 100 which circumscribes the top portion of the fitting 94. With this configuration, movement of the handle 104 downwardly and pivotally about the pivot pin 95 will result in a corresponding movement of the actuator pins 117 which engage the probe 88 in recess 100 to force it downwardly.

The handle 104 further includes a locking rod 106 which is movable within a hollow portion within the handle against a compression spring 120 for locking and unlocking the handle 104 in the open and closed position. For this purpose, a blocking boss 108 extends from the side of the coupler body 90 into the path of movement of the locking rod 106. In the normal position the compression spring 120 maintains the locking rod 106 in an extended position beyond the cross-bar 109 where it will engage the blocking boss 108. To move the handle 104 past the blocking boss 108, the handle 104 is simply pulled outwardly away from the cross-bar 109 overcoming the effect of the compression spring 120. This will retract the locking rod 106 sufficiently so that it can be moved past the blocking boss 108. Once the lever assembly 96 has been moved downwardly a sufficient distance beyond the blocking boss 108, the handle 104 can be released and the locking rod 106 will revert to its extended position engaging the blocking boss 108 from its underside. This position corresponds to the open position which is maintained until the operator disengages the locking rod 106 from the blocking boss 108.

The cross-bar 109 cooperates with a locking pin 110 to insure that the coupler assembly cannot be rotated out of position while the handle 104 is in the open position. If this were allowed to occur, fluid under pressure would spurt out of the valve assembly until the coupler was fully disengaged.

Reference should be made to FIGS. 5, 6, 7, 9, 10 and in connection with the details of the locking pin 110. Beneath the blocking boss 108 there is located extending from the coupler body 90 a locking pin holder 111 which has slidably secured therein the locking pin 110. The locking pin 110 has an upper surface 113 for engaging cross-bar 109 of the lever assembly 96 and a lower portion 115 which engages the lugs 56 on the valve body 16. The pin holder 111 defines a vertical slot 112 for slidably receiving the T-portion 114 of the pin 110. The T-portion 114 only extends from the top portion or upper portion 113 of the pin such that it can be moved downwardly within this pin slot 112. A pin spring 118 is secured within the slot 112 and is biased against the T-portion 114 to hold the pin 110 in an unlocked position against two retaining flanges 117 extending from the upper portion of the pin holder 111 as shown in FIG. 10. In this position, the pin 110 is maintained sufficiently above the top surface of the valve body 116 allowing the coupler assembly to be rotated into place.

Once in the proper position, and when it is desired to tap the keg, the lever assembly 96 is moved downwardly past the block boss 108 by actuating the handle as explained above The lever assembly 96 is pushed down to a position where the locking rod 106 can engage the under surface of the blocking boss to hold the lever assembly 96 at the open tapped position. In this position, the cross-bar 109 presses the pin 110 downwardly as shown in FIG. 5, against the force of the compression spring 118 and maintains the pin in a disposition extending sufficiently into the open area beyond the top of the valve body 16 such that rotation of the coupler assembly 20 will be blocked by the engagement of the locking pin 110 with the lug 56 as demonstrated by the phantom lined pin 110 in FIG. 9.

In this manner, the coupler cannot be rotated and withdrawn from the valve body 16, nor can it be inserted into the valve body 16, until the handle 104 is moved to the retracted or closed position disengaging the probe 88 from the valve assembly 14. This insures that the coupler assembly 20 is always in the closed position when it is being engaged with or disengaged from the valve assembly 14 avoiding the expulsion of fluid through the passageway defined between the ball valve and the valve seat, should the coupler be otherwise disengaged.

Any fluid product lost as the result of systems which do not use the above safety features could constitute a physical danger to the operator. For example, if such a valve system were used with a container having toxic fluids which could be extremely lethal in the case of agricultural chemicals such as pesticides, insecticides, fungicides etc., the failure of a safety system to provide for disengaging the valve system as described above could possibly spray a portion of this lethal fluid onto the operator.

Thus, with the above configuration, a completely safe engagement of the coupler and disengagement of the coupler can be accomplished without fear of inadvertently leaving one of the valves open which could possibly spray dangerous fluid onto the operator. In other words, the only way the coupler assembly 81 can be engaged and disengaged is when both valves 65, 73 are in a closed disposition as a result of the handle being moved upwardly to the retracted or correspondingly closed position.

Figure 4:
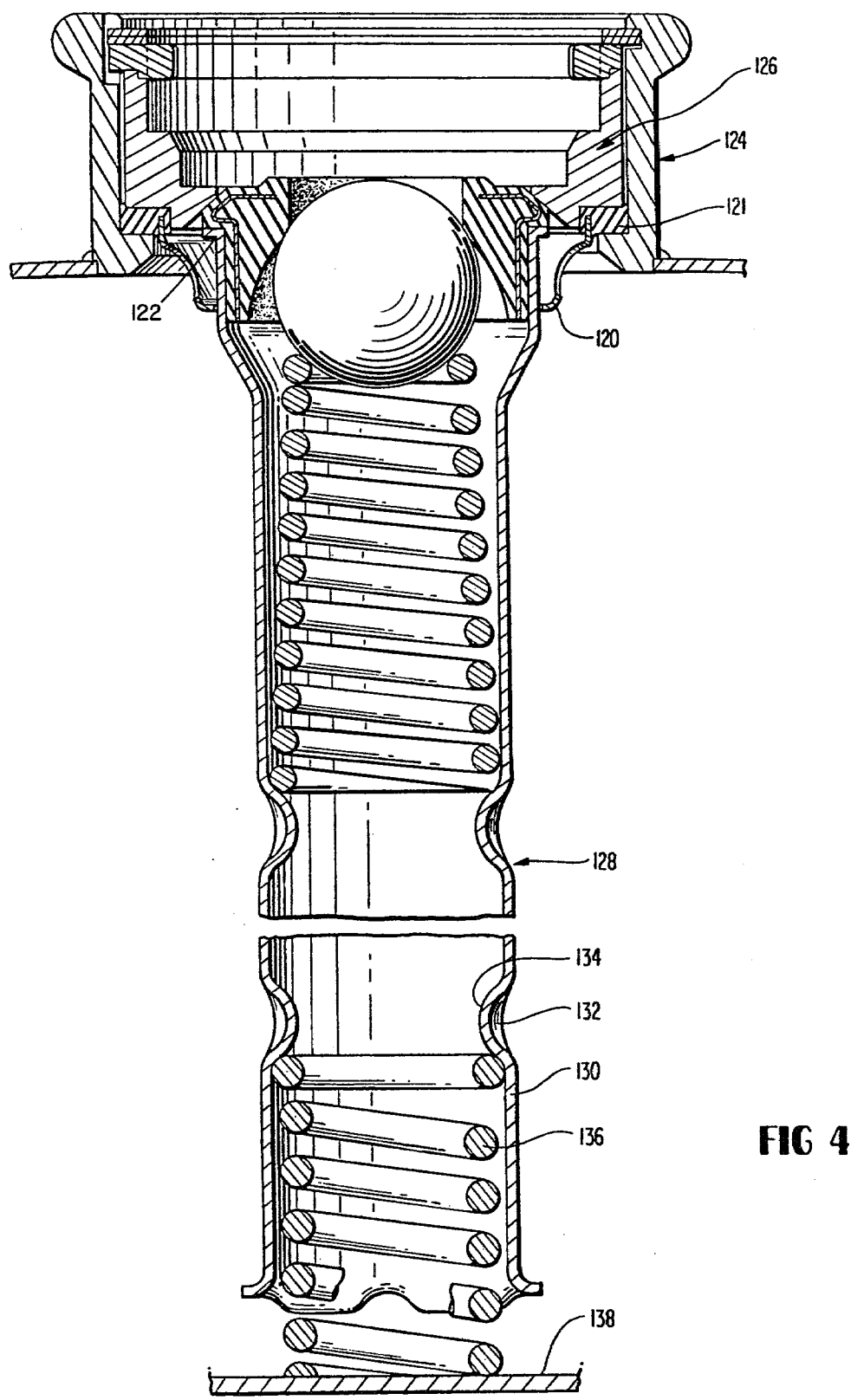
FIG. 4 is a cross-sectional view of another embodiment of a valve assembly secured within the valve neck extending from the top of a container.

Another embodiment including a valve assembly for use with a keg neck to gain access to the fluid within a keg is shown in FIG. 4. The valve assembly as shown in FIG. 4 is substantially identical to that as shown in FIG. 1 except for modifications which will be more fully explained hereinafter.

For example, instead of having a spring circumscribing the siphon tube and being contained by a rather large retainer cup, the embodiment of FIG. 4 includes a small retainer cup 120 secured to seal 121. A flange 122 extends from the top portion of siphon tube 128 entirely around its periphery. The smaller retainer cup 120 extends from the seal 121 to a position sufficiently close to the exterior surface near the top portion of the siphon tube 128 for engaging a flange 122. The sealing member 121 is retained in a position between a neck 124 and a valve body 126 in a manner similar to that described in connection with FIG. 1. It should be noted that because a large part of the spring and retainer cup construction has been eliminated in the area adjacent the valve neck, the valve neck 124 and valve body 126 of this embodiment in FIG. 4 does not require the same dimensions as the device of FIG. 1. As shown in FIG. 4, this embodiment employs a valve neck 124 and valve body 126 which has a height dimension less than that of the corresponding elements in FIG. 1.

The siphon tube 128 has a bottom portion 130 which carries a major spring 136 in a generally compressed disposition against the keg bottom 138 to maintain the first valve member 144 biased against the valve seat 146 carried by the valve body 126 in a manner similar to that described in connection with FIG. 1. More particularly, dimples 132 adjacent the bottom portion 130 are formed in the sides of the siphon tube 128 to provide bulges 134 on the inside of the siphon tube against which the top of a major spring 136 can press. The bottom of the spring 136 rests against the bottom of the keg 138. In a normal disposition, the spring is maintained compressed between the dimples 132 and the bottom of the keg 138 to force the siphon tube 128 and the valve member 144 that it carries against the valve seat 146.

The bottom portion 130 has four flared portions 140 equally spaced as can be seen in FIG. 4. These flared portions insure that cleaning fluid or other fluids inserted through the siphon tube will be equally distributed along the bottom of the keg 138 as well as the remaining portions of the keg. In addition, the flared portions insure that any undue extension of the siphon tube 128 which may cause the bottom portion 130 to engage the bottom 138 of the keg in a flush position will not impair the flow of fluid through the siphon tube since access thereto can still be had through the flared portion 140.

Also, by having the spring located within the bottom portion 138 during the washing and cleansing cycle when cleansing fluid is inserted through the valve assembly, and through the internal portions of the siphon tube, both springs will be completely washed by the fluid forced into the siphon tube under pressure. This insures that residue will not accumulate on the springs which accumulation may have an adverse effect on fluids that are ultimately added to the keg. In addition, the large retaining cup can be eliminated substantially reducing the cost of manufacture of the valve assembly. To hold the spring in place, as the valve assembly is being withdrawn from the keg, the major spring 136 is simply force-fitted into place adjacent the dimples 132. This construction is one which is simpler to assemble and manufacture when compared to the valve assemblies of the past. This simplicity is obtained without loss in efficiency and with added operational advantages.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed is:

1. A valve sealing arrangement for sealing a container of fluid comprising:
   (a) a valve assembly for providing access to said container;
   (b) a valve assembly receiving member secured to said container;
   (c) a deformable sealing member;
   (d) said valve assembly having a body portion with a seal engaging surface; and
   (e) said sealing arrangement including a non-threaded retaining member for insertion between said valve assembly and said receiving member for deforming and compressing said sealing member between said seal engaging surface of said valve assembly and said receiving member for effecting a seal between said valve assembly and said receiving member without a need for substantial rotational movement, said non-threaded retaining member being releasably secured within said receiving member at a predetermined position relative to said valve assembly for avoiding overcompression of said sealing member when said sealing member is in engagement with said seal engaging surface of the valve assembly.

2. The arrangement according to claim 1 wherein said retaining member is releasably secured to said receiving member and cooperates with said receiving member and said valve assembly to maintain the valve assembly in a predetermined position whereby said seal engaging surface will deform said sealing member against said receiving member until said retaining member is released.

3. The arrangement according to claim 2 wherein said retaining member is releasably secured with said receiving member at a predetermined position relative to said valve body to prevent over compression of said seal when said seal is in engagement with said seal engaging surface and said receiving member.

4. The sealing arrangement according to claim 3 wherein said valve receiving member includes a top portion and a bottom portion, said top portion having said means for receiving said retaining member and said bottom portion defining said seal engaging surface.

5. The arrangement according to claim 4 wherein said valve receiving member defines an inner surface, said retaining member includes a resilient member cooperating with said inner surface above the top portion of said valve body when said retaining member is engaged with said inner surface the top portion of said valve body also engages said resilient member to hold the valve body in place.

6. The valve sealing arrangement according to claim 5 wherein said inner surface defines a groove substantially entirely around the periphery adjacent the top portion of the valve receiving member and said resilient member is an expandable ring which expands into said groove leaving a portion exposed for engaging the top portion of said valve body.

7. The valve sealing arrangement according to claim 6 wherein said resilient ring is a helical ring which, in a normal state has an outer diameter greater than that of the groove whereby compression of said helical ring to fit into said groove said ring will remain in a compressed state tending to expand into said groove.

8. The valve sealing arrangement according to claim 8 further comprising safety means for retaining said valve assembly within said receiving member when said container is under pressure should said retaining member become disengaged and continuing to retain said valve assembly until an intentional motion is imparted to said valve assembly for releasing said valve assembly from said receiving member.

9. The valve sealing arrangement according to claim 8 wherein said safety means includes an offset keyway, a key carried by said valve assembly said key engaging said keyway to prevent withdrawal of said valve assembly until rotated to a predetermined position after said retainer ring has been withdrawn.

10. The valve sealing arrangement according to claim 9 wherein said groove defines an upper lip and a lower lip, said keyway includes a first portion extending downwardly through said upper lip but bound by said lower lip and a second portion offset circumferentially from said first portion extending upwardly through said lower lip but bound by said upper lip of said groove whereby said groove connects said first portion to said second portion and said key is carried by said valve member body is movable from said first portion to said second portion through said groove and from said second portion to said first portion through said groove.

11. The valve sealing arrangement according to claim 10 wherein said valve receiving member is cylindrical in configuration and its inner surface which is substantially cylindrical, said valve body having an outer surface which is substantially cylindrical with an effective diameter sufficiently less than the inner surface of said valve receiving member so that the valve body can be readily inserted and withdrawn from said valve receiving member.

12. The valve sealing arrangement according to claim 11 wherein said groove is an annular recess extending entirely around the inner surface of said valve receiving member.

13. The valve sealing arrangement according to claim 12 wherein the first portion of said keyway is a recessed area within said inner surface extending from the top of the valve receiving member through the upper lip of said groove and said second portion includes a second recessed area extending below the lower lip and through said lower lip of said groove and said first and second recessed areas being displaced circumferentially from each other and said groove connecting said first recessed area with said second recessed area.

14. The valve sealing arrangement according to claim 13 wherein said key is a boss extending from the periphery of said valve body sufficiently into said recess region to engage the upper and lower lips of said grooves defining the boundaries of said regions and also allowing movement within said regions along a vertical path limited by said upper and lower lips.

15. A valve sealing arrangement according to claim 1 further comprising safety delay means for retaining said valve assembly within said receiving member when the container under pressure until an intentional rotational motion is imparted to said valve assembly for releasing said valve assembly from said receiving member.

16. An assembly for use with a container and a valve assembly for pressurizing fluid contained in said container and operating with said valve assembly to deliver fluid under pressure to a tapping mechanism attached to said valve assembly, comprising:
   (a) a neck member configured to receive a valve assembly wherein said neck member includes an upper portion and a lower portion;
   (b) said lower portion of said neck member having a seal engaging surface;

(c) said upper portion having a receiving means for receiving a resilient non-threaded retaining member;

(d) said valve assembly having a valve body, with a complementary seal engaging surface and a retaining member engaging surface; and (e) said receiving means being located relative to said retaining member engaging surface and having a groove therein to receive said non-threaded retaining member in engageable relationship with said retaining member engaging surface of said valve body for maintaining said complementary seal engaging surface a predetermined distance from said seal engaging surface of said neck member and compressing a sealing member between said sealing surface and the complementary seal engaging surface to effect a seal between said valve assembly and said neck member and to secure said valve assembly in said neck member, said non-threaded retaining member being releasably secured within said receiving member at a predetermined position relative to said valve assembly for avoiding overcompression of said sealing member when said sealing member is in engagement with said seal engaging surface of the valve assembly.

17. An assembly according to claim 16 wherein said resilient retaining member is a resilient ring and said neck member defines an inner surface which is substantially cylindrical in configuration and said groove extends entirely around said cylindrical inner surface for receiving said resilient ring.

18. An assembly according to claim 17 wherein said seal engaging surface of said lower portion includes a lip extending radially inwardly from said inner surface and entirely around the periphery of the inner surface for engaging a deformable O-ring sealing member.

19. An assembly according to claim 18 further comprising safety means including a keyway for engaging a key carried by said valve assembly for retaining said valve assembly within said neck member until an intentional rotational movement is imparted to said valve assembly for releasing said valve assembly from said valve receiver member.

20. An assembly according to claim 16 further comprising safety delay means for retaining said valve assembly within said neck member when the container is under pressure should said retaining member become disengaged until an intentional rotational movement is imparted to said valve assembly for releasing said valve assembly from said neck member.

21. An assembly according to claim 20 wherein said safety means include a keyway, a key carried by said valve assembly, said key being located relative to said keyway to prevent withdrawal of said valve assembly until rotated to a predetermined position after the retaining member has been withdrawn.

22. A valve assembly including a siphon tube extending therefrom for use with a container having a valve assembly receiving member exposed from the top of the container comprising:

(a) a first valve and a second valve, said first valve having a first valve seat and a first valve member for movement toward and away from said seat, said second valve including a second valve seat and a second valve member mounted for movement toward and away from said second valve seat;

(b) said siphon tube having a top portion and a bottom portion, said first valve member being carried by said top portion of said siphon tube;

(c) a first biasing means engaging both said bottom portion of said siphon tube and said container for biasing said siphon tube so that said top portion with said first valve member is biased against said first valve seat for maintaining said first valve in a normally closed position; and (d) a non-thread retaining member for retaining said valve assembly within the valve assembly receiving member.

23. The valve assembly according to claim 22 wherein said first biasing means includes a spring means having one end engaging the bottom portion of said siphon tube and another end for engaging the bottom of said container.

24. The valve assembly according to claim 23 wherein said spring means extends sufficiently beyond the bottom portion of said siphon tube to be under compression when said valve assembly is secured within said valve neck holding said assembly in place for biasing said first valve member against said first valve seat.

25. The valve system according to claim 24 wherein said spring means is a helical spring carried by said bottom portion of said siphon tube.

26. The valve assembly according to claim 25 wherein said bottom portion of said siphon tube includes an interior surface and an exterior surface, said interior surface having extensions extending therefrom for engagement with said helical spring to bias said tube and said first valve member against said first valve seat.

27. The valve system according to claim 26 wherein said helical spring is force fitted against the inner surface of said bottom portion of said siphon tube adjacent said extensions for maintaining said spring in place within said siphon tube.

28. The valve assembly according to claim 27 wherein said extensions within the inner surface of the bottom portion of said siphon tube include bulges formed by dimples imparted on the outer surface of said tube.

29. A valve assembly according to claim 22 further comprising safety delay means for retaining said valve assembly within the receiving member when the container is under pressure should said retaining member become disengaged until an intentional motion is imparted to said valve assembly for releasing said valve assembly from the receiving member.

30. A valve assembly according to claim 29 wherein said safety means includes a keyway, a key carried by said valve assembly, said key being located relative to said keyway to prevent withdrawal of said valve assembly until rotated to a predetermined position after said retaining member has been withdrawn.

31. A valve assembly with a siphon tube extending therefrom for use with a container having a valve assembly receiving means comprising:

(a) a valve body wherein said valve body is configured to be releasably secured to a valve neck carried by said container;

(b) said valve assembly including a first valve and a second valve wherein said first valve includes a first valve member and a first valve seat, said first valve seat being defined by said valve body, said first valve member and said first valve seat defining a first passage therebetween;

(c) said siphon tube havng a top portion and a bottom portion, a tube passage connecting said top portion with said bottom portion, said top portion carrying said first valve member and said first valve member having a second passage therethrough communicating with said tube passage, said first valve member defining a second valve seat;

(d) a second valve member being biased by a spring means against said second valve seat to seal said second passageway;

(e) said first valve member being biased by first valve bias means engaging both said container and said bottom portion of said siphon tube so that said first valve is normally closed; and (f) a non-threaded retaining member for retaining said valve assembly within the valve assembly receiving means, 32. The valve assembly according to claim 31 wherein said first bias means includes a helical spring engaging the bottom portion of said siphon tube and biasing said siphon tube carrying said first valve member against said first valve seat when said siphon tube is secured within said valve neck, said helical spring engaging the bottom of said keg when said valve assembly is secured as aforesaid.

33. The valve system according to claim 32 wherein said second spring means includes a helical spring carried within the top portion of said siphon tube and engaging said second valve member in a normally compressed disposition for biasing said second valve member against said second valve seat to seal said second passageway.

34. The valve system according to claim 33 wherein said valve assembly includes means for maintaining said siphon tube with said first valve member connected to said valve assembly even when said first biasing means is not biasing said siphon tube with said first valve member against said first valve seat.

35. The valve assembly according to claim 34 wherein the bottom portion of said siphon tube is flared for providing a passageway into and out of said bottom portion even when said tube is forced flush against the bottom of said container.

36. The valve assembly according to claim 35 wherein said flared portions are configured to distribute fluid forced through said siphon tube outwardly across the bottom of said container for allowing substantially completely washing of said container during washing and cleansing cycles.

37. A valve assembly according to claim 31 further comprising safety delay means for retaining said valve assembly within the receiving means when the container is under pressure should said retaining member become disengaged until an intentional motion is imparted to said valve assembly for releasing said valve assembly from the receiving means.

38. A valve assembly according to claim 37 wherein said safety means includes a keyway, a key carried by said valve assembly, said key being located relative to said keyway to prevent withdrawal of said valve assembly until rotated to a predetermined position after said retaining member has been withdrawn.

39. A fluid dispensing assembly comprising:
a container for holding the fluid;
a valve assembly receiving member secured to said container;
a valve assembly arranged within said valve assembly receiving member and providing access to said container and having valves therein;
means for securing said valve assembly within said valve assembly receiving member including a deformable seal member, said valve assembly having a body portion with a seal engaging surface and a non-threaded retaining member for insertion between said valve assembly and said receiving member for deforming and compressing said seal member between said seal engaging surface of said valve assembly and said receiving member for effecting a seal between said valve assembly and said receiving member and retaining said valve assembly in said valve assembly receiving member without a need for substantial rotational movement, said non-threaded retaining member being releasably secured within said receiving member at a predetermined position relative to said valve assembly for avoiding overcompression of said sealing member when said sealing member is in engagement with said seal engaging surface of the valve assembly; and
a coupler including: a coupler body having a side fitting extending therefrom connected to a first passage within said coupler body; a probe member movable within said coupler body having a fitting connected to one end of said probe member, said probe member defining a passageway therethrough in communication with said fitting; and said probe member being movable within said coupler body between an open and a closed position whereby in said open position said coupler opens said valves of said valve assembly and connects said passages in said coupler to said open valves and in said closed position said coupler seals said passages from said valves of said valve assembly.

40. A fluid dispensing assembly according to claim 39 further comprising safety means for retaining said valve assembly within said receiving member when the container is under pressure should said retaining member become disengaged until an intentional motion is imparted to said valve assembly for releasing said valve assembly from said receiving member.

41. A fluid dispensing assembly according to claim 40 wherein said safety means includes a keyway, a key carried by said valve assembly, said key being located relative to said keyway to prevent withdrawal of said valve assembly until rotated to a predetermined position after said retaining member has been withdrawn.

42. A fluid container comprising:
walls forming a substantially closed container capable of holding pressurized fluid; and a neck assembly mounted in one of said walls for use with a valve assembly for pressurizing fluid contained in said container and operating with the valve assembly to deliver fluid under pressure to a tapping mechanism attached to the valve assembly, said neck assembly including:
(a) a neck member configured to receive a valve assembly wherein said neck includes an upper portion and a lower portion;
(b) said lower portion having a seal engaging surface;
(c) said upper portion having a receiving means for receiving a non-threaded resilient retaining member;

(d) said valve assembly having a valve body, with a complementary seal engaging surface and a retaining member engaging surface; and (e) said receiving means being located for receiving said retaining member in engageable relationship with said retaining member engaging surface of said valve body for maintaining said complementary seal engaging surface a predetermined distance from said seal engaging surface of said neck member and compressing a sealing member between said seal engaging surface and the complementary seal engaging surface to effect a seal between said valve assembly and said neck member and to secure said valve assembly in said neck member, said non-threaded retaining member being releasably secured with said receiving member at a predetermined position relative to said valve assembly for avoiding over-compression of said sealing member when said sealing member is in engagement with said seal engaging surface of the valve assembly.

43. A fluid container according to claim 42 further comprising safety means for retaining the valve assembly within said neck member when the container is under pressure should said retaining member become disengaged until an intentional motion is imparted to the valve assembly for releasing the valve assembly from said neck member.

44. A fluid container according to claim 43 wherein said safety means includes a keyway, a key carried by said valve assembly, said key being located relative to said keyway to prevent withdrawal of said valve assembly until rotated to a predetermined position after said retaining member has been withdrawn.

45. A valve sealing arrangement for sealing a container of fluid comprising:
(a) a valve assembly for providing access to said container;
(b) a valve assembly receiving member secured to said container;
(c) a deformable sealing member;
(d) said valve assembly having a body portion with a seal engaging surface;
(e) said sealing arrangement including a retaining member for deforming and compressing said seal member between said seal engaging surface of said valve assembly and said receiving member for effecting a seal between said valve assembly and said receiving member; and,
(f) safety delay means for retaining said valve assembly within said receiving member when the container is under pressure should said retaining member become disengaged thereby allowing for gas to be released from the container prior to removal of said valve assembly.

46. A valve assembly including a siphon tube extending therefrom for use with a container having a valve assembly receiving member exposed from the top of the container comprising:
(a) a first valve and a second valve, said first valve having a first valve seat and a first valve member for movement toward and away from said seat, said second valve including a second valve seat and a second valve member mounted for movement toward and away from said second valve seat;
(b) said siphon tube having a top portion and a bottom portion of said siphon tube;
(c) a first biasing means engaging both said bottom portion of said siphon tube and said container for biasing said siphon tube so that said top portion with said first valve member is biased against said first valve seat for maintaining said first valve in a normally closed position;
(d) a retaining member for retaining said valve assembly within the valve assembly receiving member; and
(e) safety delay means for retaining said valve assembly within the receiving member when the container is under pressure should said retaining member become disengaged thereby allowing for gas to be released from the container prior to removal of said valve assembly.

47. A valve assembly with a siphon tube extending therefrom for use with a container having a valve assembly receiving means comprising:
(a) a valve body wherein said valve body is configured to be releasably secured to a valve neck carried by said container;
(b) said valve assembly including a first valve and a second valve wherein said first valve includes a first valve member and a first valve seat, said first valve seat being defined by said valve body, said first valve member and said first valve seat defining a first passage therebetween;
(c) said siphon tube having a top portion and a bottom portion, a tube passage connecting said top portion with said bottom portion, said top portion carrying said first valve member and said first valve member having a second passage therethrough communicating with said tube passage, said first valve member defining a second valve seat;
(d) a second valve member being biased by a spring means against said second valve seat to seal said second passageway;
(e) said first valve member being biased by first valve bias means engaging both said container and said bottom portion of said siphon tube so that said first valve is normally closed; and,
(f) a retaining member for retaining said valve assembly within the valve assembly receiving member; and
(g) safety delay means for retaining said valve assembly within the receiving member when the container is under pressure should said retaining member become disengaged thereby allowing for gas to be released from the container prior to removal of said valve assembly.

48. A fluid dispensing assembly comprising:
a container for holding the fluid;
a valve assembly receiving member secured to said container;
a valve assembly arranged within said valve assembly receiving member and providing access to said container and having valves therein;
means for securing said valve assembly within said valve assembly receiving member including a deformable sealing member, said valve assembly having a body portion with a seal engaging surface and a retaining member for insertion between said valve assembly and said receiving member for deforming and compressing said seal member between said seal engaging surface of said valve assembly and said receiving member for effecting a seal between said valve assembly and said receiving member and retaining said valve assembly in said valve assembly receiving member;

a coupler including: a coupler body having a side fitting extending therefrom connected to a first passage within said coupler body; a probe member movable within said coupler body having a fitting connected to one end of said probe member, said probe member defining a passageway therethrough in communication with said fitting; and said probe member being movable within said couler body between an open and a closed position whereby in its open position said coupler opens said valves of said assembly and connects said passages in said coupler to said open valves and in its closed position said coupler seals said passages from said valves of said valve assembly; and safety delay means for retaining said valve assemby within said receiving member when the container is under pressure should said retaining member become disengaged thereby allowing for gas to be released from the container prior to removal of said valve assembly.

* * * * *